United States Patent [19]

Guichard

[11] Patent Number: 4,703,837

[45] Date of Patent: Nov. 3, 1987

[54] THERMALLY PROTECTED DISK BRAKE FOR A VEHICLE WHEEL, IN PARTICULAR FOR AIRCRAFT

[75] Inventor: Jean Guichard, La Garenne Colombes, France

[73] Assignee: Messier-Hispano-Bugatti (S.A.), Montrouge, France

[21] Appl. No.: 848,588

[22] Filed: Apr. 7, 1986

[30] Foreign Application Priority Data

Apr. 26, 1985 [FR] France ............................ 85 06384

[51] Int. Cl.⁴ .............................................. F16D 55/40
[52] U.S. Cl. ................................ 188/71.5; 188/264 G
[58] Field of Search ................. 188/71.5, 71.6, 264 A, 188/264 AA, 264 G

[56] References Cited

U.S. PATENT DOCUMENTS

| | | | |
|---|---|---|---|
| 2,635,714 | 4/1953 | Butler | 188/71.5 |
| 2,922,495 | 1/1960 | Griswold | 188/264 G X |
| 3,010,543 | 11/1961 | Pear | 188/264 G X |
| 3,480,115 | 11/1969 | Lallemant | 188/71.5 |
| 4,085,828 | 4/1978 | Thioux | 188/264 AA X |
| 4,147,241 | 4/1979 | Preniczny et al. | 188/264 G |
| 4,286,694 | 9/1981 | Wiseman et al. | 188/264 AA X |

*Primary Examiner*—Duane A. Reger
*Attorney, Agent, or Firm*—McAulay, Fields, Fisher, Goldstein & Nissen

[57] ABSTRACT

Thermal insulators (40,50) are each made of a material based on carbon fibers and subjected to low temperature heat treatment. One insulator (40) is disposed between a thrust means actuator (18) and a first brake stator (28a), and the other insulator (50) is disposed between a last brake stator (28b) and a brake retaining plate (30). The insulator (40) associated with the first stator (28a) is of comparable size to the stator.

15 Claims, 4 Drawing Figures

THERMALLY PROTECTED DISK BRAKE FOR A VEHICLE WHEEL, IN PARTICULAR FOR AIRCRAFT

The invention relates to a vehicle wheel disk brake, in particular a multiple-disk brake as used for braking aircraft.

BACKGROUND OF THE INVENTION

A brake of this type comprises a plurality of rotary annular plates called "rotors" and stationary annular plates commonly called "stators". These plates are in an alternating succession, with the rotors being mounted free to slide on a rotating part linked to the aircraft wheel, while the stators are mounted free to slide on a support which is fixed relative to aircraft.

Thrust means, for example hydraulic actuators, are regularly distributed around the support facing the stator-rotor assembly and brake the aircraft by thrusting the rotors and stators against one another. The rotors and stators may optionally be fitted with friction linings, depending on the nature of the material from which they are made.

More precisely, the stators are connected to the brake support by means of a torsion tube provided with a retaining plate situated opposite to the thrust means for withstanding the forces applied thereby during braking. An insulator such as an asbestos-based plate is interposed between the thrust means and the first stator of the stator-rotor assembly in order to protect each of the thrust means mounted on the support from the heat flow generated during braking. This asbestos plate is fixed to the end face of each thrust means co-operating with the first stator; it is difficult to provide satisfactory fixing therefor. In addition, such a plate only provides locally-limited protection against the undesirable influence of heat flow.

The temperatures reached by the rotors and stators during aircraft braking are about 500° C., and may rise to more than 1000° C. under extreme braking. This energy is transmitted to the brake and wheel assembly by conductivity, by heat radiation, and by convection effects.

If there is a leak of flammable liquid, in particular if the thrust means are constituted by hydraulic actuators, a fire may break out in the brake by virtue of the temperature reached.

This risk is increased when the rotors and the stators are made of new materials having high heat energy absorption capacity which enables them to operate at higher temperatures, and which consequently gives rise to greater heat flow while retaining dimensional stability.

Heat flow also has an undesirable effect on the opposite end to the thrust means, i.e. adjacent to the retaining plate fixed to the torsion tube and against which the last stator may be pressed. In this case, heat flow tends to deform the retaining plate, thereby giving rise to poor support for the last stator. Such poor support can give rise to a loss in braking efficiency.

In order to avoid such deformations of the retaining plate, intermediate protective parts are locally disposed; however, these parts merely serve to delay deformation of the retaining plate.

Preferred embodiments of the present invention remedy the various above-mentioned drawbacks by providing the thrust means with more effective protection against heat flow, and additionally they may also provide the retaining plate situated on the opposite end to the thrust means with protection against heat flow.

SUMMARY OF THE INVENTION

The present invention provides a disk brake for a vehicle wheel, in particular for an aircraft, comprising:

a plurality of stators connected to a support in such a manner as to be prevented from rotating;

a plurality of rotors connected to the vehicle wheel;

said stators and rotors being disposed in a alternating succession in an assembly having a first stator at one end and a last stator at its opposite end;

thrust means mounted facing the first stator, and a retaining plate fixed to the support facing the last stator, the first stator and the last stator each having an end face facing away from the rotors; and first thermal insulation means having an end face substantially equal to said end face of the first stator are interposed between said stator and the thrust means, said first means being also suitable for transmitting thrust from the thrust means to the first stator.

Preferably, in accordance with the invention, second thermal insulation means are also disposed between the last stator and the retaining plate, said second means also being suitable for transmitting the thrust produced by the thrust means to the retaining plate.

Also preferably, the first and second thermal insulation means are made of a composite material based on carbon fibers which constitute reinforcement, and which are bound together by a matrix of carbon which has been subjected to low temperature heat treatment.

BRIEF DESCRIPTION OF THE DRAWINGS

An embodiment of the invention is described by way of example with reference to the accompanying drawings, in which.

MORE DETAILED DESCRIPTION

Figure 1:
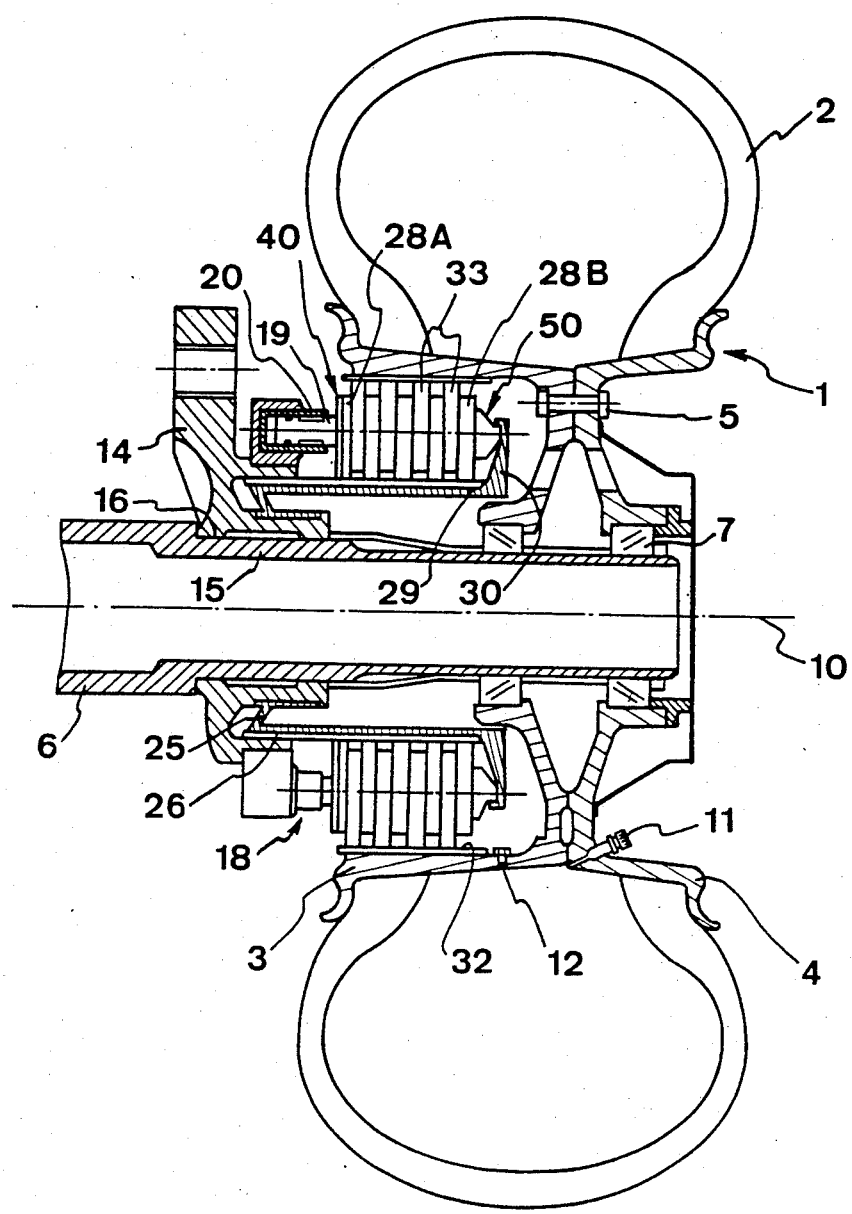
FIG. 1 is a section view on a longitudinal plane through a multiple disk brake in accordance with the invention and mounted on an aircraft wheel.

Returning more particularly to FIG. 1, this figure shows a wheel 1, e.g. of an aircraft, having a pneumatic tire 2 mounted thereon. The wheel 1 is made up of two parts 3 and 4 which are assembled together by bolts 5, and it is fitted on an axle 6 via bearings 7, with the axle 6 constituting a portion of the aircraft landing gear (not shown). The wheel 1 is thus rotatable about an axis 10 and additionally includes an inflating valve 11 on its part 4 and a thermal fuse 12 on its part 3.

A brake support 14 is mounted on a bearing surface 15 of the axle 6 by means of bearings 16.

A plurality of thrust means, e.g. hydraulic actuators 18, are mounted on the support 14 and are distributed at substantially equal distances from one another. Each actuator 18 comprises a piston 19 slidably mounted in a cylinder 20.

A torsion tube 25 is fixed to the support 14. Its outer side face 26 supports a plurality of stators 28 which are constrained to rotate together with said tube. The end 29 of the tube is shaped to constitute a retaining plate 30 and extends in a plane perpendicular to the tube 25.

A plurality of rotors 33 constrained to rotate with the wheel 1 are mounted on the inside face 32 of the part 3 of the wheel 1. Each rotor alternates with a stator to constitute an assembly which begins with a first stator 28a having an outer face facing towards the thrust means 18, and ends with a last stator 28b having an outer face facing towards the retaining plate 30.

Figure 2:
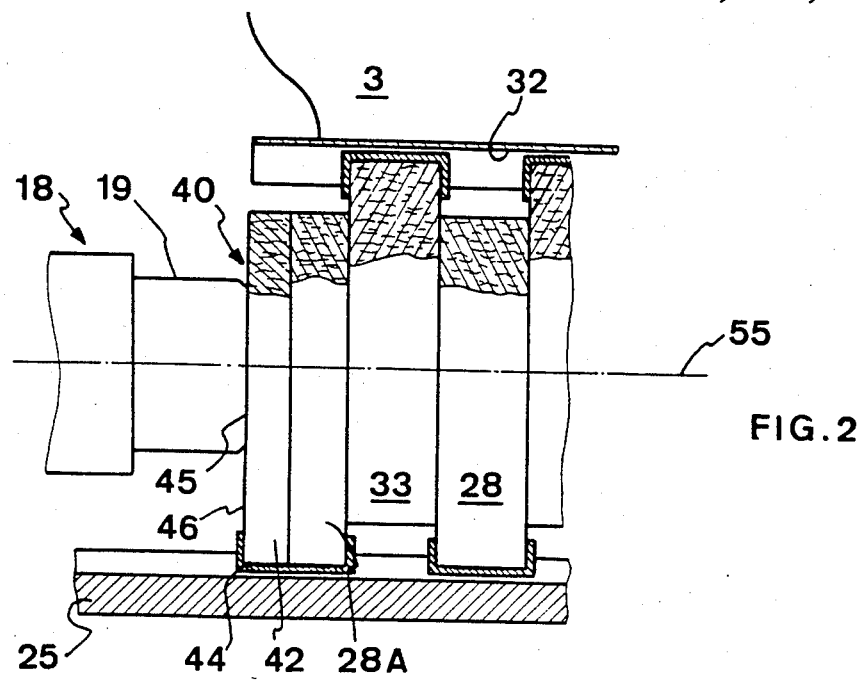
FIGS. 2 and 3 are views on a larger scale showing the first and the last rotors and the stators respectively, together with the thrust means and a brake retaining plate shown in FIG. 1.

FIG. 2 shows first heat insulating and thrust distributing means 40 which are disposed between the first stator 28a and the thrust means 18. These first means are constituted, in this example, by an annular plate 42 having the same shape and substantially the same area as the end face of the first stator 28a. Said plate 42 is connected to the stator 28a, for example, by means of metal clips 44. The clips are in the form of rings which are channel shaped in radial section and which encompass between their flanges the inside peripheries of the annular plate 42 and of the first stator 28a. Thus, the end face 45 of each piston 19 co-operates directly with the end face 46 of the annular plate 42. This simple assembly suffices for holding the annular plate 42 constantly pressed against the first stator 28a.

Advantageously, the annular plate 42 is made of a carboncarbon composite material which has been subjected to low temperature heat treatment at about 1,000° C. A carbon-carbon composite material treated at a high temperature of about 2,400° C. may be used for constituting the brake stators 28 and rotors 33. However, the relatively low temperature treatment applied to the plate 42 has the characteristic of conferring very low thermal conductivity thereto, giving it a thermal conductivity which is about 10 to 15 times less then the thermal conductivity conferred to carbon by high temperature treatment. Thus, the plate 42 acts as a heat shield preventing a large part of the energy developed during braking from dissipating out from the brake towards the thrust means. The outside temperature of the end face 46 of the plate 42 is much less than the temperature of the rotor-stator assembly.

Figure 3:
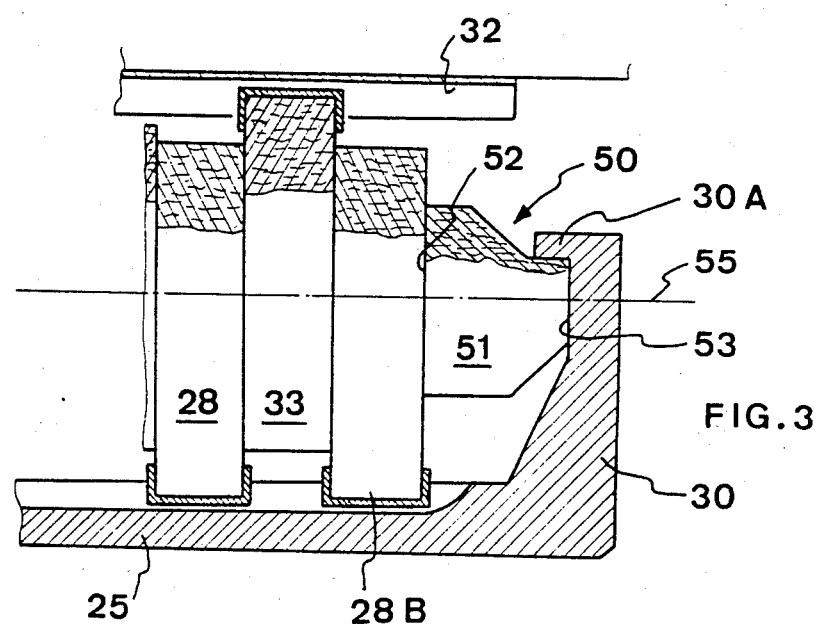

FIG. 3 shows that heat insulation and bearing means 50 are also disposed between the last stator 28b and the retaining plate 30. These second means 50 are constituted, in this case, by a ring 51, e.g. having a tapering profile in radial section. One of its end faces 52 bears against the end face of the last stator 28b, and its other end face 53 bears against the retaining plate 30. The retaining plate 30 has a plane face surrounded by a circumferential rim 30A which extends axially towards the last stator 28b, thereby providing a recessed portion. The ring 51 enters the recessed portion and has a circumferentially outer face which fits against the circumferentially inner face of the rim 30A. The axial extent of the rim is large enough to ensure that the ring 50 remains contained therein in an axial direction when the brake is in the non-clamped state.

In the same manner as the first means 40, the second means 50 are made of a carbon-carbon composite material which is treated at relatively low temperature and which has the same characteristics as those described above for the first means.

The ring 51 bears against the last stator 28b providing a plane which is accurately perpendicular to the line of thrust 55 of the actuators 18 when said actuators act on the statorrotor assembly.

This disk brake operates as follows: when an aircraft has landed on a runway, the pilot applies pressure by means of a control pedal which has the effect of causing each piston 19 to move out from its respective cylinder 20 and to press the stators and rotors against one another to a greater or lesser extent depending on various parameters taken into account by the pilot in order to brake the aircraft properly. The heat energy evolved by the stators and the rotors when they rub against one another causes their temperature to rise to about 500° C., and sometimes much higher, in the event of extreme braking. The heat is not directly transmitted out from the stator-rotor assembly by virtue of the insulation means 40 and 50 which act as heat shields.

Because the annular plate 42 and the ring 51 are made of a carbon structure material treated at low temperature, having the particular advantage of very low heat conductivity and of adequate mechanical strength, temperature falls off with a steep gradient which is located, for the most part, within said insulation means. Thus, the temperatures observed outside the rotor-stator assembly are acceptable and no longer constitute a danger either to the hydraulic actuators nor to the retaining plate 30 whose undesirable deformation is to be avoided.

It may be observed that the annular plate 42 of the first means 40 also serves as a plate for distributing pressure over the stator-rotor assembly.

Figure 4:
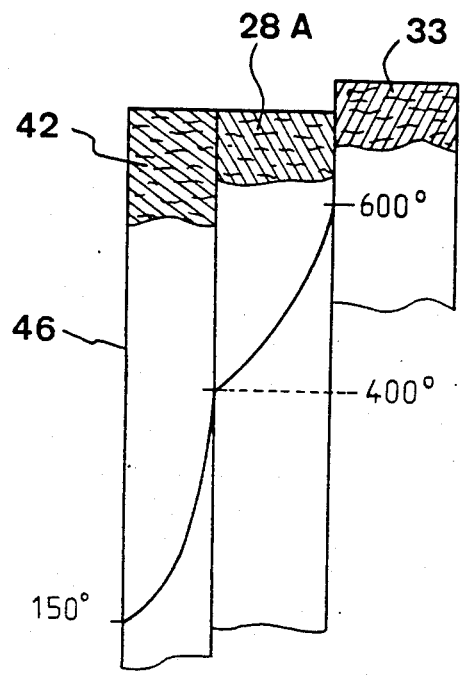
FIG. 4 is a diagram showing the thermal insulation effect provided by the invention.

The FIG. 4 diagram shows, by way of example, that the temperature of the first stator 28a during normal braking lies at about 600° C. between the contacting faces of the first rotor 33 and the first stator 28a, and that this temperature drops to a value of 400° C. on the end face of the first stator 28a where it is in contact with the annular plate 42, with a temperature gradient which depends on the material used.

The temperature through the annular plate 42 co-operating with the stator 28a drops very rapidly in the thickness of the plate 42 and has a value of 100° C. to 150° C. on its surface which is in direct contact with the pistons 19. This temperature value is completely acceptable for the actuators 18, even though the limit temperatures of its hydraulic fluid and its sealing rings are relatively low.

In addition, the use of a carbon-carbon composite to make the thermal insulation means 40 and 50 serves to minimize the mass of the insulation means by virtue of the low density of the composite, and also allows the overall thickness of the assembly to be kept to a reasonable value.

The means 40 and 50 could be embodied in other ways without going beyond the scope of the invention.

I claim:

1. A disk brake for a vehicle wheel, in particular for an aircraft, comprising:
    a plurality of stators connected to a support in such a manner as to be prevented from rotating;
    a plurality of rotors connected to the vehicle wheel;
    said stators and rotors being disposed in an alternating succession in an assembly having a first stator at one end and a last stator at an opposite end;
    thrust means mounted facing said first stator, and a retaining plate fixed to a support facing said last stator, said first stator and said last stator each having an end face facing away from said rotors; and
    first thermal insulation means made of a carbon composite treated at low temperature and having an end face substantially equal to said end face of said first stator and being interposed between said first stator and said thrust means, said first thermal insualtion means also being suitable for transmitting thrust from said thrust means to said first stator.

2. A brake according to claim 1, including a second thermal insulation means made of a carbon composite treated at low temperature and having an end face substantially equal to said end face of said last stator and being disposed between said last stator and said retaining plate, said second thermal insulation means being suitable for transmitting the thrust produced by said thrust means to said retaining plate.

3. A brake according to claim 1, wherein said first thermal insulation and thrust transmission means comprise an annular plate having an end face applied against said end face of the first stator.

4. A brake according to claim 3, wherein the annular plate is connected to the first stator by fixing means.

5. A brake according to claim 2, wherein the second thermal insulation and thrust transmission means comprise a ring placed between the last stator and the retaining plate.

6. A brake according to claim 5, wherein the retaining plate has an axially directed circumferential rim extending towards the last stator and providing a recessed portion of sufficient depth for containing the ring when the brake is not in the clamped condition.

7. A brake according to claim 1, wherein the stators and rotors are made of a carbon-carbon composite treated at high temperature.

8. A brake according to claim 1, wherein said first thermal insulation means is subjected to a heat treatment at about 1000° C. for conferring low thermal conductivity thereto.

9. A brake according to claim 2, wherein both said first and said second thermal insulation means are subjected to a heat treatment at about 1000° C. for conferring low thermal conductivity thereto.

10. A brake according to claim 1, wherein said stators and rotors are formed from a carbon-carbon composite treated at a temperature of about 2400° C.

11. A brake according to claim 2, wherein the composite material of said first and second insulation means is based on carbon fibers bound together by a mixture of carbon subjected to the low temperature.

12. A brake according to claim 1, wherein said thrust means includes a plurality of hydraulic actuators mounted on said support and uniformly spaced-distributed from one another, each said actuator including a cylinder and a piston having one end free cooperating with said first thermal insulation means and another end received within said cylinder for holding the end face of said first thermal insulation means constantly pressed against said end face of said stator.

13. A brake according to claim 5, wherein said ring has a tapering profile in radial section, and one of said end faces of said ring bearing against the end face of said last stator, and the other end face of said ring bearing against said retaining plate.

14. A brake according to claim 2, wherein said stators and rotors are formed from a carbon-carbon composite treated at a temperature of about 2400° C.

15. A brake according to claim 9, wherein said stators and rotors are formed from a carbon-carbon composite treated at a temperature of about 2400° C.

* * * * *